Aug. 18, 1959     E. TERILLI     2,899,755
COLOR COMPARISON
Filed April 7, 1954
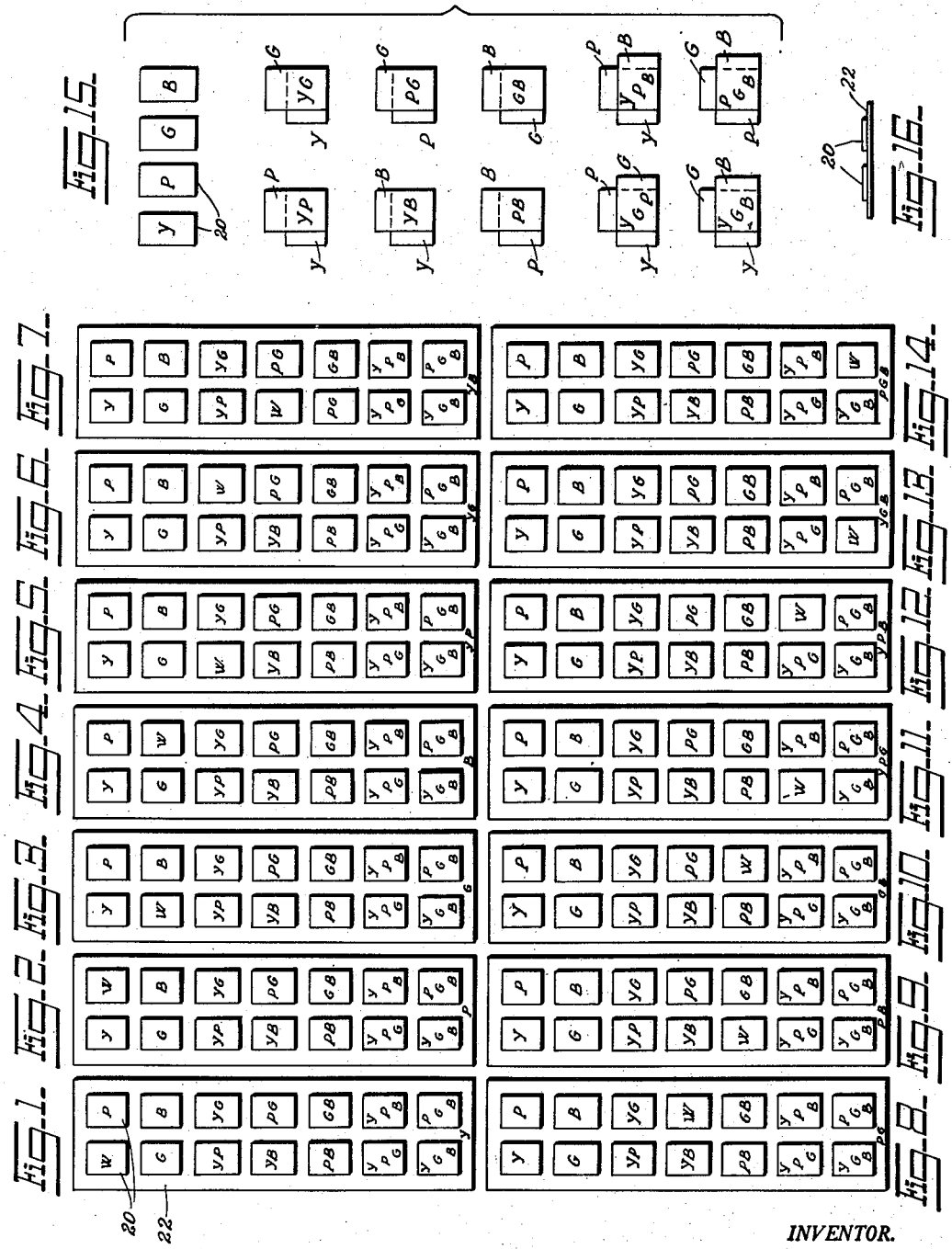
INVENTOR.
EMIL TERILLI
BY
ATTORNEY United States Patent Office 2,899,755
Patented Aug. 18, 1959

2,899,755
COLOR COMPARISON
Emil Terilli, New York, N.Y.
Application April 7, 1954, Serial No. 421,554
1 Claim. (Cl. 35—28.3)

This invention relates to a system whereby there is graphically recorded, in an orderly manner, an exceptionally large number of colors and color combinations.

Heretofore, there have been devised color systems, color charts, color harmonizing devices, etc. However, so far as is known none of these has ever achieved the orderly provision of a great number of color scales any of which can be conveniently referred to, to ascertain what will be the effect of mixing or surprinting two or more colors of the scale referred to. It is, accordingly, one important object of the present invention to provide a color system which can be advantageously used in this manner.

A further object of importance is to provide, in each of said scales, immediately apparent means for showing the sequence with which said colors of the scale are to be mixed or surprinted to produce, in combination, another color shown on the scale.

Yet another object is to provide, in a system of color charts or scales of the nature referred to, means for showing immediately and in a graphic manner the effect obtained by placing each color of the scale against another color of the same scale. It is further proposed, in this regard, in graphically showing to the user the effects so obtained, to make immediately apparent the seeming changes of color obtained when the same color is used against differently colored backgrounds.

The invention, it should be noted, is a particularly valuable aid in the fields of work employing creative artists, such as the commercial art field, etc. Further, the color system is of particular value to reproduction craftsmen employed in the graphic arts field. It is proposed, in this regard, to so design the system as to facilitate its easy and rapid usage by artists and craftsmen employed in the creative and reproductive arts, in a manner that will save the users substantial time and expense in the preparation and production, for example, of printed material made with multicolor line printings.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figs. 1 to 14, inclusive, respectively show individual panels on which a plurality of colors, obtained by use of different colors of a single scale, are represented, the several panels being of different colors to show the effects obtained by placing the individual colors of the scale against backgrounds of different colors.

Fig. 15 shows a single one of the scales and the colors produced therefrom.

Fig. 16 is an edge elevational view of one of the background panels having a series of color tabs mounted thereupon.

In the system constituting the present invention, a basic group of eleven full strength colors is used. These colors are red, yellow, green, blue, purple, black, red/yellow, yellow/green, blue/green, purple/blue, and red/purple.

Each of these eleven colors is broken down into four different strengths, that is, a full strength color, and three shades all of which are paler than the full strength color, and each of them noticeably different from one another. Thus, each of the eleven colors is broken down into a full strength color, a second color lighter than the full strength color, a third color lighter than the second color, and a fourth, pale color lighter than the third color.

Utilizing the 44 colors obtained in the manner referred to above, one provides 330 major scales. A major scale is one comprising any combination of four of the full strength eleven colors named above.

Each of the 330 major scales is now broken down into 64 arbitrary other scales. In each of the 64 scales, at least one of the colors in the scale is changed in strength.

It will now be seen that the system comprises at least 21,120 scales each different from all the rest, each scale being comprised of four colors, in any one of the possible combinations of four colors chosen from the 44 basic colors in the system.

It should be noted, in this connection, that when the colors are printed on tabs and panels to be filed away for possible referral, transparent material will be used. The transparent material is used because its function in the system is to serve as a filter means, said filter means being used to subtract colors from the source of light against which the filters are viewed.

It will thus be seen that the 44 colors obtained in the manner described above, and arranged in 21,120 individual scales in an orderly manner as set forth above, comprise one feature of the color system.

As a second feature in this system, it is possible to obtain a maximum of fourteen colors from each of the 21,120 individual color scales. This is done by surprinting two or three colors of the scale.

Reference should now be had to the drawings wherein, in Fig. 15, there is shown, at the top of the figure, the four colors of one of the scales. It will be understood that this is merely one of the 21,120 individual scales and is shown purely by way of example.

In the drawing, the reference numeral 20 has been applied to color tabs comprising the scale, which tabs could be of rectangular, somewhat elongated formation. It is preferred that the tabs be elongated in one direction, rather than made perfectly square, for a reason to become apparent hereinafter.

In any event, the four tabs of the particular scale shown have been lettered to show the colors thereof. Thus, the scale comprises yellow, purple, green, and blue, the letters Y, P, G and B being used for these respective colors.

As shown, if the color Y is first printed, and then the color P surprinted thereupon, the lapping portions of the surprinted colors will produce a new color, designated YP in Fig. 15. Counting colors Y, P, G, and B, the color YP makes a fifth color in the particular scale.

If, now, the color Y is printed and the color G is then surprinted thereupon, a new color YG results, and this is added to the other five colors. This is carried on until a total of 14 colors is obtained. As shown in Fig. 15, some of the colors are obtained by surprinting three colors. Thus, the color Y may first be printed, after which the color P is surprinted thereupon, and then the color G surprinted upon the lapping portions of the colors Y and P to produce a color YPG.

It will thus be seen that fourteen colors are obtained in each of the 21,120 scales. It is important to note, in this regard, that the surprinting operation must be carried out in a particular manner to produce the combination colors. Thus, by the use of rectangular areas of relatively elongated formation, one area is shown on its side, and the area surprinted thereupon is shown standing upwardly. Thus, the area Y is shown on its side, while the area P is shown standing upwardly. The area Y thus projects to the left of the combination color, and the area P projects thereabove to produce the color YP when the two areas overlap. The basic colors of the areas are, however, clearly visible to the left of and also above the combination color. The area projecting to the left will always be the first color printed, after which the color projecting above the combination will be the second color printed, while the color projecting to the right (as for example the color G used in producing the combination YPG) will be the last printed. If this order is not followed, a serious variation in the color obtained will result. Thus, the sequence of surprinting is very important.

With the fourteen colors obtained in each of the 21,120 individual scales, a third important feature of the color system is provided. This feature includes the use of several panels to make combinations of colors, with the colors being shown against different backgrounds.

These panels are shown in Figs. 1 through 14, and also in Fig. 16, and have been designated by the reference numeral 22. They would, when reduced to a physical embodiment, be formed of a transparent material, to provide the desired filter effect previously noted herein, and transparent, small color tabs 20 would be attached thereto in the order shown in the drawings. The same order would always be followed, and for each of the 21,120 scales, fourteen different, elongated panels 22 would be used, each panel having fourteen color tabs secured thereto, said color tabs being the colors of the particular scale.

Each of the fourteen panels would be colored exactly to the color of one of those of the particular scale. Thus, panel 22 in Fig. 1 is yellow, and has been designated Y at its lower end. The panel in Fig. 2 has been designated P. The panel in Fig. 3 has been designated G, and the sequence is followed without deviation throughout the remaining panels of the series.

Because each panel will be an identical color match with one of the color tabs, that particular color tab is replaced with a white, opaque tab designated at W.

By reason of this arrangement, one is able to study each color of a scale against a background composed of a different color of the same scale. Suitable color combinations can thus be chosen, said combinations being chosen so as to be in harmony and of such a nature as to satisfy aesthetic senses.

Since colors have halos, a fourth feature of importance results, deriving from the fact that these halos have the power to make a given color appear different when placed against different colors. The use of the several panels, in juxtaposition to one another as shown, provides this added feature by giving the user actual visible evidence of the changes. This has been accomplished by placing each of the fourteen colors of a scale in the same position on the various panels.

The color system is applicable, of course, to all printing processes. When so used, one can check various color combinations, and can also ascertain what colors will result from mixing or surprinting other colors. The results will be accurate at all times, since there will not be any color or combination of colors that an artist can create, that will not be in the total of 21,120 charts made.

With the color system, accordingly, there can be recorded graphically any color combination that can possibly be thought of by artists. In the field of art, a person able to make a combination of seven colors is considered highly proficient, and it will thus be seen that the color system is of great value in such field.

It is to be understood that instead of color tabs 22, colors in any form may be superimposed on another color to obtain a resultant color.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

The method of displaying graphically the effects of surprinting a plurality of basic colors in a superposed relation, consisting of the steps of placing a rectangular-shaped transparent tab of a deep basic color on a supporting surface, overlaying another transparent tab of similar configuration and of a contrasting deep basic color on said first-named tab in perpendicular fashion so that the ends of said tabs project laterally of the superposed portions of the tabs, and overlaying a third transparent tab of similar configuration and of a deep basic color contrasted to the colors of the first two named tabs upon said second-named tab in a perpendicular fashion so that the end of said third-mentioned tab extends laterally between the laterally extending ends of the first two named tabs, said surprinting producing a final color constituting a combination of the three colors indicated by the extending ends.

References Cited in the file of this patent

UNITED STATES PATENTS

| | | |
|---|---|---|
| 13,358 | Wagner | Jan. 9, 1912 |
| 1,703,449 | Huebner | Feb. 26, 1929 |
| 2,007,264 | Allen | May 3, 1933 |
| 2,409,285 | Jacobson | Oct. 15, 1946 |